US012077715B2

United States Patent
Douglas Miller

(10) Patent No.: US 12,077,715 B2
(45) Date of Patent: Sep. 3, 2024

(54) APPARATUS, METHOD AND CATALYST FOR PROCESSING HYDROCARBONS FOR RECYCLING

(71) Applicant: Edward Douglas Miller, Hasfield (GB)

(72) Inventor: Edward Douglas Miller, Hasfield (GB)

( * ) Notice: Subject to any disclaimer, the term of this patent is extended or adjusted under 35 U.S.C. 154(b) by 0 days.

(21) Appl. No.: 17/797,364

(22) PCT Filed: Feb. 4, 2021

(86) PCT No.: PCT/GB2021/050244
§ 371 (c)(1),
(2) Date: Aug. 3, 2022

(87) PCT Pub. No.: WO2021/156616
PCT Pub. Date: Aug. 12, 2021

(65) Prior Publication Data
US 2023/0053932 A1 Feb. 23, 2023

(30) Foreign Application Priority Data

Feb. 4, 2020 (GB) .................................... 2001497

(51) Int. Cl.
*C10G 1/10* (2006.01)
*B01D 3/14* (2006.01)
(Continued)

(52) U.S. Cl.
CPC ............ *C10G 1/10* (2013.01); *B01D 3/14* (2013.01); *B01D 5/006* (2013.01); *B01J 8/0285* (2013.01);
(Continued)

(58) Field of Classification Search
None
See application file for complete search history.

(56) References Cited

U.S. PATENT DOCUMENTS 6,013,158 A * 1/2000 Wootten .................. C10K 1/02
425/72.1
7,980,312 B1 * 7/2011 Hill ...................... E21B 43/241
166/272.2
(Continued)

FOREIGN PATENT DOCUMENTS

CN 101722036 B 8/2011
CN 106221749 A 12/2016
(Continued)

OTHER PUBLICATIONS

International Search Report, EPO, Jun. 8, 2021, PCT/GB2021/050244.
(Continued)

*Primary Examiner* — Tam M Nguyen
(74) *Attorney, Agent, or Firm* — Invention To Patent Services; Alex Hobson

(57) ABSTRACT

A method 10 for processing hydrocarbons for recycling includes the steps of: a) heating solid and/or liquid hydrocarbons in a chamber 16 in the absence of air, to convert at least some of the hydrocarbons into hydrocarbon gas; b) reacting the hydrocarbon gas in a reactor 20 or conduit with a catalyst 22 including a transition metal or transition metal salt, and a carbide, to break the hydrocarbon gas down into hydrocarbon products; and c) collecting the hydrocarbon products or conveying the hydrocarbon products elsewhere for use.

10 Claims, 1 Drawing Sheet

(51) Int. Cl.
*B01D 5/00* (2006.01)
*B01J 8/02* (2006.01)
*B01J 37/08* (2006.01)
*C10G 1/00* (2006.01)

(52) U.S. Cl.
CPC ............ B01J 37/088 (2013.01); C10G 1/002 (2013.01); *B01J 2208/0053* (2013.01); *C10G 2300/1003* (2013.01); *C10G 2300/1007* (2013.01)

(56) References Cited

U.S. PATENT DOCUMENTS

| | | | | |
|---|---|---|---|---|
| 8,569,200 | B2* | 10/2013 | Kang | ...................... B01J 37/031 585/653 |
| 2006/0112639 | A1* | 6/2006 | Nick | ....................... C10K 1/005 48/198.1 |
| 2008/0103333 | A1* | 5/2008 | Nubel | .................... B01J 27/224 562/485 |
| 2009/0012340 | A1 | 1/2009 | Choi et al. | |
| 2009/0105066 | A1 | 4/2009 | Kang et al. | |
| 2015/0080624 | A1 | 3/2015 | Gephart et al. | |
| 2016/0017232 | A1* | 1/2016 | Ullom | ..................... C10G 1/02 202/117 |
| 2019/0002664 | A1 | 1/2019 | Streiff et al. | |
| 2019/0322834 | A1* | 10/2019 | Yao | .......................... C07C 69/48 |
| 2021/0214622 | A1* | 7/2021 | Engelman | ............... C10G 1/002 |
| 2023/0092645 | A1* | 3/2023 | Holmgren | ............... C07C 67/03 435/157 |
| 2023/0201912 | A1* | 6/2023 | Pedmo | .................... B28B 7/348 249/117 |

FOREIGN PATENT DOCUMENTS

| | | |
|---|---|---|
| CN | 107970963 A | 5/2018 |
| FR | 3041359 A1 | 3/2017 |
| JP | 2000254454 A2 | 9/2000 |
| RU | 2433165 | 11/2011 |

OTHER PUBLICATIONS

Search Report Under Section 17(5), GB Intellectual Property Office, Jul. 6, 2020, GB2001497.3.
UK Extermination Report, GB Intellectual Property Office, Mar. 6, 2024, GB2001497.3.
Muhammad N. Almustapha et al. Modification of acidic and textural properties of a sulphated zirconia catalyst for efficient conversion of high-density polyethylene into liquid fuel, Environmental Science and Pollution Research, (2020) 27:55-65.

* cited by examiner

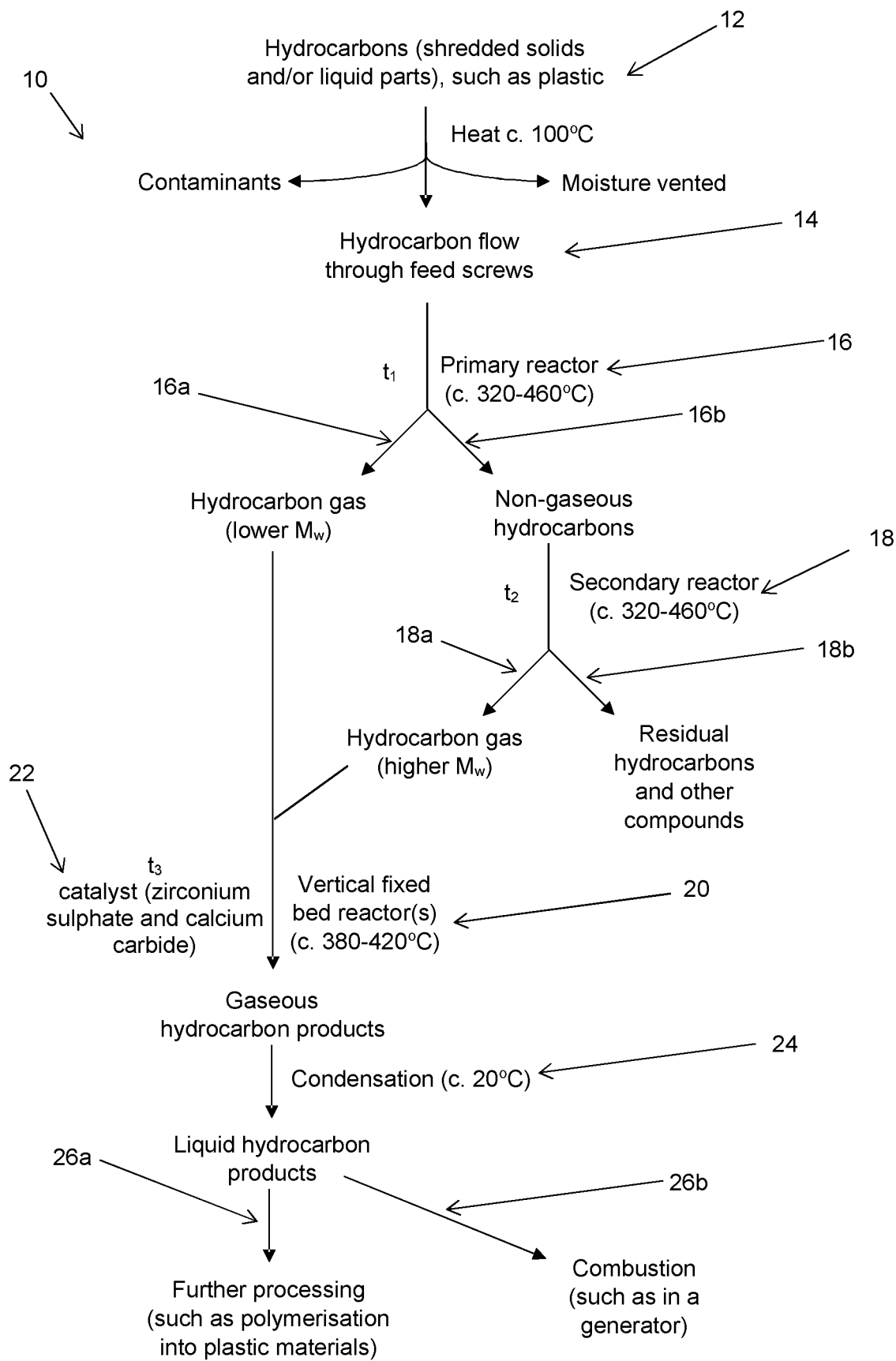

APPARATUS, METHOD AND CATALYST FOR PROCESSING HYDROCARBONS FOR RECYCLING

The present invention relates to an apparatus and method for processing hydrocarbons for recycling, without using hydrogen gas. The present invention also relates to a catalyst for use in that apparatus and method, and a method of making the catalyst.

BACKGROUND TO THE INVENTION

Plastic is a versatile material, and is widely used in durable low-cost packaging, amongst other things. However, its use in packaging has become problematic because of the millions of tonnes of plastic which are discarded as waste every year. A significant amount of waste plastic ends up in landfill or contaminating the environment in another way as a result.

Plastics are slow to break down naturally in the environment. Where they do break down, they generate microplastics and nanoplastics particles, for example in natural bodies of water like seas and oceans, which may be harmful to health of a variety of organisms. Even before they begin to break down, animals can eat or become caught in plastic items, which can be detrimental to their health. Millions of tonnes of plastics enter the oceans and every year, and methods of removing plastic from the oceans are being explored. However, the problem remains of what to do with the plastic once it has been collected. The same is true of waste plastic which remains on land.

Efforts are being made by environmentally-conscious manufacturers to migrate to packaging which is recyclable, but change is only coming slowly. The amount of plastic currently being recycled is still dwarfed by the remaining amount of waste plastic generated globally every year, and the problem is getting worse.

Many conventional plastics are already recyclable, and efforts are being made to increase the amount of plastic which is recycled. For example, plastic bottles, bags and food containers tend to be collected from UK households and recycled. Plastics intended for recycling are sometimes recycled locally or nationally, but are sometimes shipped overseas. Transporting waste over large distances causes increased pollution due to fuel usage, and in addition plastic shipped overseas may end up being sent to landfill or dumped in the sea if regulatory enforcement is lax, frustrating recycling efforts.

It can be difficult to easily identify and separate recyclable types of plastics from each other and from non-recyclable plastics, in order to recycle similar plastics in batches. Sorting is necessary because recycling mixed plastics together can result in a material of lesser quality than the starting materials, and because some plastics are incompatible for recycling. For example, PVC labels on PET bottles are currently identified by sight and removed, because it is difficult to recycle PET when it is contaminated with PVC- PVC has poor thermal stability when mixed with PET. However, it is not always easy to identify the type of plastic used. Furthermore, different plastics have different flow properties (rheology), melting properties, phase behaviour, thermal stability and density, for example. These factors restrict how plastics mixtures and/or plastic blends are recycled.

Another factor with plastics recycling is the use of 'filler' materials in many plastics to modify the plastic material properties. For example, plastics can include around 10% to 20% filler materials such as UV stabilisers, pigments (e.g. carbon black), or calcium carbonate. These filler materials can adversely affect the plastic recycling process. Contaminants such as dust or metals can also have a deleterious effect on recycling apparatus.

Plastics are in some cases heated at temperatures of 650° C. or more to ensure hydrocarbon breakdown, but this is very energy intensive. Plastics can also be incinerated to generate energy, but this releases carbon dioxide and contributes to adverse climate change. Other harmful gases can also be generated.

Hydrocarbons are used to produce other products such as engine oil (or motor oil). During use, engine oil gradually becomes contaminated with metal particles, and must be replaced. Old engine oil can be burned to generate power, as with plastics. However, this must be done at high temperatures to ensure complete combustion and avoid generating harmful substances such as dioxins and furans. This is energy-intensive and incurs significant cost, and there are regulatory restrictions on how it can be recycled in some countries. There is a need for a more cost-effective way of recycling engine oil.

It is an object of the present invention to reduce or substantially obviate the aforementioned problems.

STATEMENT OF INVENTION

According to the present invention, there is provided a method of processing hydrocarbons (particular plastics and/or engine oil) for recycling, without using hydrogen gas or hydrogenation, comprising the steps of:
  a) heating solid and/or liquid hydrocarbons to remove or drive off water, and further heating the hydrocarbons in a chamber in the absence of air, to convert or gasify/ vapourise at least some of the hydrocarbons into hydrocarbon gas;
  b) in a subsequent or downstream reactor or conduit, reacting the hydrocarbon gas with a catalyst including (or prepared from) a transition metal or transition metal salt, and a carbide, to break the hydrocarbon gas down into hydrocarbon products; and
  c) collecting or conveying the hydrocarbon products for subsequent use in liquid or gas form.

Optional features are presented in dependent claims 2 to 10.

The method enables mixed plastics to be recycled together, and also enables some hydrocarbon oils to be recycled. That is, a mixture of hydrocarbons, e.g. having a range molecular weights (such as light, medium, heavy) may be processed at the same time, without first isolating or distilling hydrocarbons having a particular range of molecular weights. The mixture may include a plurality of plastic items. This allows for waste plastic and oil conversion to useful products, including fuels and relatively small hydrocarbons, via a multi-stage and relatively low-temperature catalytic gasification process. It is not necessary to pre-treat the plastics prior to carrying out the method.

The method is particularly suitable for recycling mixed polyolefins, optionally with one or more polystyrenes (or styrenes). That is, the invention allows polyolefinic and styrenic plastics to be recycled together. It is not necessary to sort or separate different types of plastics from each other prior to recycling. This allows bulk recycling of plastic waste from many different sources, particularly any domestic plastics such as waste plastic bottles and food containers, providing a viable solution to the plastic waste crisis in the environment.

The method can advantageously selectively produce hydrocarbon products which are liquid at room temperature and pressure (r.t.p., typically 20° C. and 1 atm). Very few hydrocarbons which are gaseous at r.t.p. are produced (only up to about 3% of the products), which simplifies collection of most of the hydrocarbon products. It is of course possible to tailor the process to generate simple Ci to $C_4$ alkanes, and/or for gas collection means to be provided, if simple gaseous hydrocarbons are desired.

The method may be considered to be a thermocatalytic process.

The method can produce hydrocarbon products which are suitable for combustion in a power plant (such as an anaerobic digestion plant) or a generator or a vehicle, such as a petrol or diesel-powered vehicle for example. The hydrocarbon products may be transferred to the plant whilst still in a gaseous form or state, for example.

The method has been used to process polyolefins and produce hydrocarbon products suitable for pouring into a diesel generator to produce electricity. The method has also been used to process polyolefins with styrenes, producing hydrocarbon products in the form of a fuel which has self-lubricating properties suitable for use in a diesel engine. The hydrocarbon products may be suitable for polymerisation into new plastics.

In particular, the catalyst can selectively break down (or depolymerise) longer carbon chains (typically alkanes) into shorter carbon chains. Most of the hydrocarbon products formed by the method are at least $C_5$ hydrocarbons (or hydrocarbons with at least one linear carbon chain of at least 5 carbon atoms), and may be up to $C_{60}$ hydrocarbons. The products may be $C_5$ to $C_{60}$ hydrocarbons. Usually, the products may include linear alkanes, but may include branched and/or cyclic hydrocarbons or other hydrocarbons such as aromatic compounds, depending on the feedstock used. For example, if polystyrene(s) are processed, the method can break down the polystyrene(s) into simple aromatic compounds such as benzene and/or toluene.

The catalyst may selectively reduce or modulate carbon chain lengths of the hydrocarbons to a specific chain length or range of carbon chain lengths. The composition of the catalyst can be selected to favour or control chain-shortening of the hydrocarbons to a particular chain length or range of chain lengths.

The method may also be considered a method of manufacturing hydrocarbon fuel or simple hydrocarbon compounds from plastic waste or used engine oil.

The terms gasified and gasification are used in this specification to refer to the phase change of a substance from a non-gas state into a gas state.

The transition metal salt may be independently selected from a group comprising: a zirconium salt, a metal sulphate, and zirconium sulphate. Zirconium sulphate is preferred in some embodiments, because it is particularly selective for the hydrocarbon products discussed above.

The carbide may be a metal carbide or a semi-metal carbide. The metal carbide may be a transition metal carbide or an alkali earth metal carbide.

The carbide may be independently selected from a group comprising: titanium carbide; tungsten carbide; niobium carbide; calcium carbide; molybdenum carbide; silicon carbide. Calcium carbide, tungsten carbide and/or niobium carbide are preferred in some embodiments.

It is believed that the carbide moiety inhibits or suppresses (or otherwise regulates) the catalytic activity of the transition metal or transition metal salt, and so limits the extent of chain-shortening during the passage of hydrocarbon gas through the catalyst in the reactor or conduit.

The carbide (or carbides) may be provided as a powder or as a fine particulate. The carbide(s) may be ground up, crushed or pulverised in a suitable manner to provide the same. For example, a ball mill or planetary mill may be used to prepare the carbide.

In some embodiments, a mixture or blend of any two or more of the carbides may be used.

The solid and/or liquid hydrocarbons may be independently selected to include one or more of the following: two or more different plastics or polyolefins, optionally also including one or more polystyrenes; lubricating oil; synthetic oil; mineral oil; engine oil.

This allows recycling of a mixture comprising multiple different types of plastics, such as a mixture of polyethylene, PET and polystyrene, for example. Various hydrocarbon oils can also be recycled using the same process. It should be noted that the triglycerides and bio-fuels are not currently recyclable using this process. Recycling of these fuels requires the use of hydrogen gas, and hydrogen gas is not used to break down hydrocarbons in the claimed invention. That is, hydrogenation is not carried out.

Where solid plastic items are provided, step (a) may include substantially reducing the size of the plastic items (prior to heating/melting). For example, the plastic may be reduced in size by shredding or grinding to produce plastic flakes or similar. The combination of mechanically breaking down plastic items and then catalytically decomposing the remaining plastic material contributes to an efficient process.

Step (a) may include removing contaminant material from the hydrocarbon mixture. Step (a) may include heating the hydrocarbons to a temperature sufficient to remove moisture.

The hydrocarbons may initially be heated to a temperature of around 100° C. This produces a 'molten' gummy mixture which can be directed to flow for subsequent gasification. Heating the hydrocarbons to around 100° C. drives off water and encourages separation of contaminant materials. It is not necessary to wash the waste material to remove contaminants prior to processing. Contaminant materials may include food waste or the filler materials discussed above, for example.

Step (a) may include substantially melting at least some or preferably all of the solid hydrocarbons, where solid hydrocarbons are provided in the feedstock for the process. For example, the hydrocarbons may be heated to a temperature in the region of about 225° C.

The hydrocarbons may be heated sufficiently to form one or more melt seals at the entrance to the chamber. That is, at least some of the melted or liquid hydrocarbons seal the entrance as they flow into the chamber. This excludes air (particularly oxygen) from the heating chamber, which could otherwise affect the gasification step.

After moisture and contaminants have been removed, and the hydrocarbons have entered the chamber, the hydrocarbons may be heated to a temperature in the range 320° C. to 460° C. Preferably, the hydrocarbons are at a temperature in the range of about 380° C. to 420° C. This causes lighter molecular weight hydrocarbons to gasify (turn into gas form).

Step (a) may include:
i) heating the solid and/or liquid hydrocarbons for a period of time in a first reactor or conduit, to convert at least some lower molecular weight hydrocarbons into a first hydrocarbon gas; and ii) heating the solid and/or liquid hydrocarbons remaining from step (i) for a longer period of time in a second reactor or conduit, to convert at least some of higher molecular weight hydrocarbons into a second hydrocarbon gas.

This allows approximately 70% of the hydrocarbons to be gasified (converted to gas) in step (i). The remaining hydrocarbons, which on average have heavier molecular weights, can be transferred to a second reactor or chamber for further heating and gasification. The second reactor or chamber may be larger than the first reactor or chamber.

Preferably, not all of the hydrocarbon feedstock is gasified. There may be some leftover material which includes about 5% polymeric material from the hydrocarbon feedstock. This can be useful because the polymeric residue is a lubricant which aids collection of other leftover material (such as solids or viscous liquids) from the chamber. Thus, the method may be used to collect hydrocarbons for use in solid form.

Other leftover material or by-product(s) from step (ii) typically comprises 'filler' materials from the plastics which are being recycled. For example, filler materials may include: pigments, UV stabilisers, gloss finishes, and/or calcium carbonate. This material has been found to be particularly hygroscopic and suitable for use as a desiccant.

In step (b), the lighter and heavier portions of hydrocarbon gas can be transferred to the same reactor or conduit for catalytic decomposition by the same catalyst. This can avoid creating a pressure imbalance within the system.

The catalyst may be provided in at least one fixed bed reactor. The fixed bed reactor may be a vertical fixed bed reactor. As the reaction in step (b) proceeds, lighter hydrocarbon gas fragments can rise up through the vertical reactor.

The hydrocarbon gas may take at least two seconds to pass through or over the catalyst. For example, this may be achieved by controlling the flow rate of hydrocarbon gas, and/or by providing a suitable flow path of suitable length through the catalyst-containing part of the reactor or conduit.

The catalyst may be provided on a plurality of catalytic beads or another suitable substrate. The catalyst may be a heterogeneous catalyst for the hydrocarbon gas. The distribution of catalyst in the reactor or conduit may be used to influence the time required for hydrocarbon gas to pass therethrough.

In some cases, the gas portions may be catalysed in different reactors and/or conduits. That is, the first (relatively lighter) hydrocarbon gas can be reacted with a first catalyst, and the second (relatively heavier) hydrocarbon gas can be reacted with a second catalyst. This can be useful if different catalyst compositions (for example, different ratios of carbide) are preferred for lighter and heavier molecular weight hydrocarbon gases. The relative amount of carbide in the second catalyst may be substantially the same or less than the relative amount of carbide in the first catalyst.

The reactor or conduit in step (b) may be heated to a temperature of between about 320° C. to 460° C., or the temperature inside the reactor during use may be in that temperature range. Preferably, the temperature range is about 380° C. to 420° C. More preferably, the temperature is about 400° C.

The hydrocarbon products produced in step (b) may have an average molecular weight or average chain length which is substantially less than the average molecular weight or average chain length of the hydrocarbon gas produced in step (a). In particular, the average chain length of polyolefins in the hydrocarbon products may be between $C_5$ and about $C_{60}$.

Step (c) may include condensing some or all of the hydrocarbon products into one or more liquid products at room temperature and atmospheric pressure. This simplifies collection of the hydrocarbon products, since the equipment required to collect and contain liquid hydrocarbons is less complex than that for gases. A fractional distillation system may be used for condensing the hydrocarbon products.

The hydrocarbon products from the lighter and heavier hydrocarbon gases may be collected together, or may be collected separately if broken down in different reactors.

Step (c) may include transferring the hydrocarbon products to a container or burning the hydrocarbon products to power a device such as a generator or anaerobic digestion (AD) plant. This avoids the need to collect and transport volatile substances to another site for use.

Where polyolefin hydrocarbons are processed, the hydrocarbon products may include one or more alkanes.

Where polystyrene hydrocarbons are processed, the hydrocarbon products may include one or more aromatic compounds.

The hydrocarbon products may include compounds having a range of carbon chain lengths substantially corresponding to one or more of the following: naphtha (or about $C_5$ to $C_9$), petrol (or about $C_5$ to $C_{10}$), kerosene (or about $C_{10}$ to $C_{16}$), diesel (or about $C_{14}$ to $C_{20}$). That is, the hydrocarbon products collected in step (c) may be suitable for immediate use as fuel for a vehicle or generator. It is possible to produce some lubricating oil (or about $C_{20}$ to $C_{50}$) and fuel oil (or about $C_{20}$ to $C_{70}$), but these are not the major products.

It has been found that the products of the method can typically comprise between about 0-10% gasoline (or petrol), between about 20-40% kerosene, and between about 40-80% diesel. In some cases, there may be about 5% gasoline, about 25% kerosene, and about 70% diesel. Minor or negligible amounts of other products may be present in some cases.

The feedstock used affects the proportion of each fraction, as does the catalyst composition and the temperature profile of the apparatus, amongst others. The feedstock may include waste hydrocarbons from multiple sources. The mixture of feedstock portions from different sources may be selected to result in a particular blend of products.

Customizing the feedstock from two or more hydrocarbon sources is useful to affect the products of the process without changing the catalyst or temperature profile of the reaction. This tends to apply where the hydrocarbons from two or more sources are known to mainly comprise particular hydrocarbons or types of plastic (e.g. having already partly or wholly sorted hydrocarbons or plastic according to type).

Steps (a) to (c) may be performed substantially continuously, if there is a substantially continuous supply of hydrocarbons in step (a).

The method may include any feature or features presented with respect to any other aspect of the invention.

According to a second aspect of the invention, there is provided an apparatus for processing hydrocarbons for recycling without using hydrogen gas or hydrogenation, the apparatus comprising:

a heating system including at least one heating chamber for receiving solid and/or liquid hydrocarbons, a flow (or feed) system for transferring hydrocarbons into the at least one heating chamber, and heating means for gasifying or vapourising at least some of the solid and/or liquid hydrocarbons in the at least one heating chamber into hydrocarbon gas, at least one reactor or conduit connected to and downstream from the at least one heating chamber for receiving the hydrocarbon gas, the reactor or conduit including a catalyst including (or prepared from) a transition metal or transition metal salt, and a carbide, for breaking the hydrocarbon gas down into hydrocarbon products, and at least one of: a collection system for condensing the hydrocarbon products into liquid, and an outlet conduit for transferring the hydrocarbon products away from the reactor or conduit.

Optional features are presented in dependent claims 12 to 18.

The apparatus is advantageous for similar reasons to those presented in the first aspect of the invention.

The apparatus may include a shredding or grinding system for mechanically breaking down solid hydrocarbons. The mechanical breakdown precedes the chemical breakdown of the hydrocarbons. The shredding or grinding system may be connected to the heating system for transferring hydrocarbons to the heating system. This ensures that large plastic items, such as plastic bottles, are cut up into small plastic pieces or fragments before they are processed further. This improves the speed with which solid plastics melt prior to gasification.

Hydrocarbons or plastics may be supplied or fed into the apparatus under gravity. The flow or feed system may include one or more gravimetric feeders, for example.

The heating system may include one or more stuffing machines. In particular, the stuffing machines may be vented stuffing machines. This compensates for back pressure which can be produced through the build up of water evaporating from the hydrocarbon mixture.

In some embodiments, one or more feed screws may be provided for removing contaminants and/or moisture from the hydrocarbons before gasification. The feed screw(s) help supply material to the heating chamber.

The heating means may heat the hydrocarbons prior to entry into the heating chamber.

The feed screw(s) may be in the form of an Archimedes' screw. A tube may be disposed around the or each screw. The screw(s) may be rotated in a reverse direction to the hydrocarbon flow through the screw. That is, the screw may be rotated in a direction which encourages motion in one direction, whilst the hydrocarbons nonetheless flow in the other direction. This provides a well which allows forward flow of the hydrocarbons (such as molten plastic and/or engine oil) being processed whilst also allowing moisture to be vented from the hydrocarbons. It also helps to stop contaminants in the hydrocarbons from passing further into the system.

The heating means may include one or more variable geometric elements. The variable geometric element(s) may in use establish (or help to establish) one or more melt seals where hydrocarbons enter the heating chamber.

The heating means may include any combination of the following elements: one or more mono-lobed elements; one or more bi-lobed elements; one or more tri-lobed elements. The lobed elements may be considered as variable geometric elements, and may be used in any suitable combination.

The lobed elements may be rotatable to mix the hydrocarbon mixture and evenly dissipate heat within the mixture. This allows very accurate control of the temperature of the mixture. For example, the temperature of the mixture may be kept within about a 2° C. temperature profile, such as 459° C. to 461° C.

The lobed elements can be useful for gradually raising the temperature of the hydrocarbon mixture. The lobed elements may help evenly raise the temperature of the hydrocarbon mixture from about 225° C. to the desired temperature in the reactor, which may be about 460° C. This is helpful where different hydrocarbons or plastics in the mixture melt differently which could adversely affect gasification if the mixture is not heated evenly.

There may be a first heating chamber for converting lower molecular weight hydrocarbons into hydrocarbon gas. There may also be a second heating chamber for converting higher molecular weight hydrocarbons into hydrocarbon gas. The second chamber may be connected to the first chamber for receiving hydrocarbons which were not gasified in the first chamber. The connection may allow hydrocarbons to flow from the first chamber to the second chamber under gravity, for example along a downward slope or down a sloped conduit.

The second heating chamber may be larger or have a larger volume than the first heating chamber. That is, there is a much greater free volume within the second chamber to encourage gasification of the heavier molecular weight hydrocarbons.

The residence time of the hydrocarbons in the second chamber may be longer than for the first chamber for the heavier hydrocarbons to become gasified. The residence time may be on the order of seconds, e.g. less than 60 seconds.

The temperature or temperature profile in the second heating chamber may be greater than that of the first heating chamber. For example, hydrocarbons in the second heating chamber may be heated to or at a temperature of about 500° C.

It is not generally necessary to provide lobed elements in the second heating chamber. This is because the temperature profile of the hydrocarbon mixture does not need to be raised significantly, unlike for the first heating chamber. For example, the temperature difference between hydrocarbons in the first and second heating chambers may only be about 40 to 50° C., whereas the temperature difference between hydrocarbons before and after heating in the first heating chamber may be about 200° C. or more.

The reactor or conduit may include a fixed bed reactor (such as a vertical fixed bed reactor). A plurality of reactors and/or conduits may be provided, which may include a plurality of vertical fixed bed reactors. The reactors may be provided in series.

The collection system may include a fractional distillation system or condensing means for condensing the gaseous hydrocarbon products into liquid. This allows the hydrocarbon products to be separated into particular constituents (or subsets of constituents) on site, which is more efficient than shipping the products elsewhere for processing.

The condensing means may include a passive condenser, where the hydrocarbon products may condense under ambient conditions, or may include a cooling apparatus to liquefy some or all of the products.

The flow system may be a continuous feed system. That is, the apparatus may be adapted to run continuously, subject to the availability of a sufficient supply of hydrocarbons suitable for recycling.

The flow system may be adapted to cause the residual material in the chamber to flow out for collection. For example, the apparatus may include a slope or gradient for the material to flow out. This is particularly useful for continuous operation of the apparatus.

One or more valves (such as butterfly valves) may be provided for closing an inlet and/or an outlet of the heating chamber. This allows the heating chamber to be isolated so that it can be changed or cleaned. This may be necessary on occasions where solid residue or materials build up inside the chamber. This is particularly applicable where the second heating chamber is provided.

The transition metal salt may be independently selected from a group comprising: a zirconium salt, a metal sulphate, and zirconium sulphate. Preferably, the transition metal salt includes zirconium sulphate.

The carbide may be independently selected from a group comprising: titanium carbide; tungsten carbide; niobium carbide; calcium carbide; molybdenum carbide; silicon carbide.

The apparatus may include any feature or features presented with respect to any other aspect of the invention. This particularly applies to the features of the catalyst, but extends to other features as well.

According to a third aspect of the invention, there is provided a catalyst (or catalyst composition) for breaking down higher molecular weight hydrocarbons into lower molecular weight hydrocarbons, the catalyst comprising a transition metal or transition metal salt, and a carbide. The ratio of transition metal or transition metal salt to carbide may be from about 2:3 to 3:2. Preferably the catalyst reduces carbon chain lengths in the hydrocarbons during use.

Optional features are presented in dependent claims 20 to 21.

The catalyst is advantageous because is suitable for use in the method and apparatus of the first two aspects of the invention, and for similar reasons to the first aspect of the invention.

The ratio may be a molar ratio or may be a weight ratio (w/w). Preferably a weight ratio is used.

The ratio may be about 1:1 (transition metal or transition metal salt:carbide). The ratio is selected according to the desired extent of hydrocarbon decomposition or chain shortening. The greater the relative amount of carbide, the less hydrocarbon decomposition occurs for a given period of time in the catalyst reaction chamber. For example, a ratio of between 50:50 to about 45:55 may be used. The lower the relative amount of carbide, the more hydrocarbon decomposition occurs for a given period of time in the catalyst reaction chamber. For example, a ratio between 50:50 and about 55:45 may be used.

In practice, this means that the amount of carbide can be tailored to provide particular hydrocarbon products or a particular range of hydrocarbon chain lengths. For example, the relative amount of carbide may be slightly less than the amount transition metal salt, in which case lighter fuels (such as gasoline or kerosene) can be produced.

In another example, the relative amount of carbide may be more than the amount transition metal salt, in which case heavier fuels (such as diesel) are produced. Diesel produced in this way has been found to have a lower flash point than standard diesel produced from fossil fuels.

The transition metal or transition metal salt may include one or more elements independently selected from a group comprising: zirconium, scandium, titanium, vanadium, chromium, manganese, iron, cobalt, nickel, copper, zinc, yttrium, niobium, molybdenum, ruthenium, rhodium, palladium, silver, cadmium, hafnium, tantalum, tungsten, rhenium, osmium, iridium, platinum, gold, mercury.

The transition metal salt may include a zirconium salt.

The transition metal salt may include a metal sulphate.

The transition metal salt may include a salt (or anion) which is thermally stable up to about 460° C.

In preferred embodiments, the transition metal salt includes zirconium sulphate. The zirconium sulphate may be anhydrous.

The carbide may be a metal carbide or a semi-metal carbide. The metal carbide may be a transition metal carbide or an alkali earth metal carbide.

The carbide may be independently selected from a group comprising: titanium carbide; tungsten carbide; niobium carbide; calcium carbide; molybdenum carbide; silicon carbide. Calcium carbide, tungsten carbide and/or niobium carbide are preferred.

A mixture or blend of any two or more carbides may be used.

The catalytic compounds in the catalyst may consist essentially of the transition metal or transition metal salt, and the carbide.

The catalyst may include any feature or features presented in any other aspect of the invention.

According to a fourth aspect of the invention, there is provided use of a catalyst according to the third aspect of the invention, to process hydrocarbons for recycling.

This particularly applies to recycling of mixed plastic feedstocks. That is, two or more different types of plastic, such as any combination of two or more plastics, which may be independently selected from a group comprising: PET (polyethylene terephthalate), PVC (polyvinylchloride), PP (polypropylene), PE (polyethylene), and PS (polystyrene).

The fourth aspect of the invention may include any catalyst feature or features presented in any other aspect of the invention.

According to a fifth aspect of the invention, there is provided a method of preparing a catalyst for use in processing hydrocarbons for recycling, the method comprising the steps of:
 a) providing a transition metal or transition metal salt on one or more substrates;
 b) adding a carbide to the one or more substrates.

Optional features are presented in dependent claims 24 to 27.

The method may include binding the transition metal salt to one or more as catalytic beads.

The method may include the step of heating or calcining the transition metal salt after step (a) and before step (b).

The method may include the step of heating or calcining the transition metal salt and carbide after step (b).

Calcination may be performed using a ball mill. Calcination may in either or both steps be performed at a temperature of around 400° C.

The transition metal salt may include zirconium sulphate. The zirconium sulphate may be prepared from zirconia (zirconium oxide) and sulphuric acid. The zirconium sulphate may be prepared from zirconium hydroxide and sulphuric acid. The sulphuric acid used to prepare the catalyst may have a concentration in the range 0.05 mol dm$^{-3}$ to 1 mol dm$^{-3}$. The acid preferably has a concentration of about 0.5 mol dm$^{-3}$.

Where zirconium hydroxide and sulphuric acid are used, around 1 ml to 24 ml of sulphuric acid is used for 1 g of zirconium hydroxide. Preferably about 12 ml of sulphuric acid is used for 1 g of zirconium hydroxide. The amounts can be scaled as needed.

In the catalyst, a ratio of a) zirconium sulphate or zirconia to b) metal carbide or metal oxide may be in the range 10:90 to 90:10 wt %. Preferably the ratio is about 50:50 wt %. This is particularly preferred where the catalyst includes zirconium sulphate and calcium carbide.

The method of making the catalyst may include any feature or features presented with respect to any other aspect of the invention. This particularly applies to the features of the catalyst, but extends to other features as well.

According to another aspect of the invention, there is provided a method of processing hydrocarbons for recycling, comprising the steps of: a) heating solid and/or liquid hydrocarbons in a chamber in the absence of air, to convert at least some of the hydrocarbons into hydrocarbon gas; b) reacting the hydrocarbon gas in a reactor or conduit with a catalyst including a transition metal or transition metal salt, and a carbide, to break the hydrocarbon gas down into hydrocarbon products; and c) collecting or conveying the hydrocarbon products for use in liquid or gas form.

According to another aspect of the invention, there is provided an apparatus for processing hydrocarbons for recycling, the apparatus comprising: a heating system including at least one heating chamber for receiving solid and/or liquid hydrocarbons, a feed system for transferring hydrocarbons into the at least one heating chamber, and heating means for converting at least some of the solid and/or liquid hydrocarbons in the at least one heating chamber into hydrocarbon gas; at least one reactor or conduit connected to the at least one heating chamber for receiving the hydrocarbon gas, the reactor or conduit including a catalyst which includes a transition metal or transition metal salt, and a carbide, for breaking the hydrocarbon gas down into hydrocarbon products, and; at least one of: a collection system for condensing the hydrocarbon products into liquid, and an outlet conduit for transferring the hydrocarbon products away from the reactor or conduit.

BRIEF DESCRIPTION OF THE DRAWINGS

For a better understanding of the present invention, and to show more clearly how it may be carried into effect, reference will now be made by way of example only to the accompanying drawings, in which:

FIG. 1 shows a flowchart of steps for recycling hydrocarbons such as mixed plastics.

DESCRIPTION OF PREFERRED EMBODIMENTS

Referring to FIG. 1, a process for recycling hydrocarbon waste is indicated generally at 10. The process 10 may be carried out as a continuous process using suitable apparatus, as described below. The process 10 is particularly suitable for converting mixed polymers and/or heavy hydrocarbon oils into fuels or small to medium weight hydrocarbons or monomers. The average throughput in this embodiment about 350 kg of waste hydrocarbon material per hour (approximately 100 g per second).

Hydrocarbon feedstock (not shown) is initially provided at the stage indicated generally at 12. The feedstock may include solid components, such as plastic bottles, trays or containers, and/or may include one or more liquid components, such as engine oil. In this embodiment, the feedstock contains a mixture of products made of first or second polyolefins. The solid and liquid states are used to describe the materials to be recycled when they are at ambient temperature and pressure (r.t.p.). Any solid components have been shredded for processing in this embodiment.

The feedstock is heated to a temperature of around 100° C. or so. This is not generally sufficient to melt the plastic waste in the feedstock yet, but the temperature should be sufficient to allow the plastic to flow. The temperature may be increased if necessary for particular solid feedstock combinations to flow.

The heated hydrocarbon feedstock is directed to flow through feed screws (not shown) at the stage indicated generally at 14. The feed screws rotate in a direction which allows water vapour to vent from the heated hydrocarbons, whilst the hydrocarbons flow in the opposing direction. The direction of rotation also keep contaminant material from progressing beyond the feed screws. The feed screws in this embodiment help to melt the plastic.

The melted material is then forced via the screws directly into a conventional heated twin rotation primary reactor (not shown), at the stage indicated generally at 16. The reactor includes a heating system (not shown) and a chamber (not shown) including rotatable geometric elements (not shown). The configuration of the geometric elements helps to establish melt seals at the entry to the reactor. This prevents air from entering the chamber and reacting with the melted hydrocarbon material, for example.

Rotation of the geometric elements generates friction which can heat the mixture, although other heating means are also used. The geometric elements have a very high surface area and are grouped such that their rotation transfers heat evenly and efficiently within the entire melted hydrocarbon mixture that occupies the chamber. This contributes to phase transitions in the hydrocarbon mixture, at the expense of a reduced free volume within the reactor. This has been confirmed by using thermogravimetric analysis (TGA) to obtain a temperature profile of the mixture.

The primary reactor is usually at a temperature of between 320 to 460° C. In this embodiment, the primary reactor is at a temperature of 400° C. This is sufficient to gasify lighter molecular weight hydrocarbons in the mixture, creating a hydrocarbon gas. Typically, the mixture is heated for about 30 seconds ($t_1$) to generate an amount of hydrocarbon gas. The hydrocarbon gas is routed to vertical fixed bed reactors (not shown) via a conduit as indicated at 16a.

In the meantime, the non-gaseous hydrocarbons in the primary reactor are passed into chamber (not shown) in a secondary reactor (not shown) as indicated at 16b. Material passes from the first reactor to the secondary reactor under gravity. A heating system (not shown) is provided for the second chamber, or in some cases the heating system for the first chamber may be configured to heat the second chamber as well.

The secondary reactor has a larger free volume than the primary reactor. The secondary reactor has an L-shaped profile as seen from above. The secondary reactor is usually at a temperature of between 320 to 460° C. In this embodiment, the secondary reactor is at a temperature of 410° C., i.e. it has a slightly higher temperature profile.

In order to gasify the heavier molecular weight portions of the hydrocarbon mixture, the mixture is kept in the secondary reactor for a longer time than in the primary reactor. Typically it takes a matter of seconds (a under a minute, $t_2$) to convert most of the remaining hydrocarbons into a hydrocarbon gas. The hydrocarbon gas is routed to the vertical fixed bed reactors (not shown) via another conduit as indicated at 18a. The residual hydrocarbons and filler material left in the second chamber are removed as indicated at 18b.

Although the flows of hydrocarbon gas 16a, 18a are shown as joining prior to reaching the fixed bed reactors, it will be appreciated that this is not essential and the flows may instead feed separately into the reactors. It will also be appreciated that the flow of hydrocarbon gas may be routed to a plurality of reactors in parallel, or passed sequentially through a series of one or more reactors.

The vertical fixed bed reactors, indicated generally at 20, contain a catalyst (not shown) as indicated generally at 22. The catalyst is provided on a plurality of catalytic beads in this embodiment. The catalytic beads substantially fill each fixed bed reactor.

In this embodiment, the catalyst contains a 1:1 weight ratio (w/w) of zirconium sulphate and calcium carbide. This catalyst has been found to be stable for the range of reaction conditions tested and selective for the desired hydrocarbon products. The ratio may be varied from 2:3 to 3:2, in some embodiments.

The catalyst can be prepared as follows. A solution of zirconia is prepared and acidified by addition of sulphuric acid (0.5M). The acidified solution is stirred and, once the reaction is complete, drained to provide zirconium sulphate in a conventional manner. It will be appreciated that zirconium sulphate may be prepared or provided by alternate means.

Catalytic beads are coated with an amount of the zirconium sulphate. The catalytic beads are subsequently calcined, for example at approximately 400° C. in a ball mill. The catalytic beads are next coated in an approximately equivalent amount of calcium carbide powder. The catalytic beads are subsequently calcined again, for example at approximately 400° C. in a ball mill. The beads are then ready for use as a catalyst in the vertical fixed bed reactors.

The vertical fixed bed reactors are usually at a temperature of between 380 to 420° C. In this embodiment, the reactors are at a temperature of 400° C. Preferably, this temperature is not exceeded for the catalyst in this embodiment. The heating system for the primary or secondary reactors may be used to control the fixed bed reactor temperatures, or a separate heating system may be provided.

As hydrocarbon gas passes through the vertical fixed bed reactors, it is decomposed by the catalyst into hydrocarbon products. The catalyst is regenerated at the relatively low temperatures used during the process. The hydrocarbon gas takes at least two seconds ($t_3$) to pass through a fixed bed reactor system in this embodiment. The longer the residence time in presence of the catalyst, the greater the degree of hydrocarbon decomposition. The extent of hydrocarbon decomposition can be controlled by modifying the catalyst composition to include more or less carbide, as described above.

A condensation system (not shown) is then used to condense the hydrocarbon products into liquid form at room temperature (20° C.), as indicated generally at 24. The condensation system includes a fractional distillation system (not shown) in this embodiment, in order to obtain hydrocarbon fractions containing specific ranges of carbon chain lengths for petrol and diesel fuels, for example. The hydrocarbon products can be sent for further processing such as refinement, indicated at 26a. The hydrocarbon products can be sent to a power plant or generator to generate electricity, indicated at 26b. The hydrocarbon products could be put into a container or pumped into a tanker for delivery to a fuel station, for example.

The invention therefore enables relatively low temperature processing of a mixture of different plastics or hydrocarbon polymers using a thermo sulphated catalytic process.

It will be appreciated that other embodiments may include other features, such as any features or features in the above statements of invention.

The invention is mainly used to decompose thermoplastics, but it is possible to include some thermosetting plastics in the hydrocarbon feedstock. Thermosetting plastics may not gasify to a significant extent, but may form part of the bulk material of the solid matter which remains post-gasification.

It is also possible to decompose some rubber or rubberised material (such as vehicle tyres) using the invention. It is usually better to recycle rubber in combination with polyolefins and/or polystyrenes, to limit the amount of the carbon black from the rubber in the resulting residue.

It will be appreciated that other transition metal elements or transition metal salts may be used to put the invention into effect. For example, in some embodiments, another of the transition metal elements mentioned in the statements of invention may be used in combination with a carbide.

In some embodiments, any of the carbides mentioned in the statements of invention may be used instead of or in addition to calcium carbide, or another carbide may be used.

The embodiments described above are provided by way of example only, and various changes and modifications will be apparent to persons skilled in the art without departing from the scope of the present invention as defined by the appended claims.

What is claimed is:

1. A method of processing hydrocarbons for recycling, without using hydrogen gas, comprising the steps of:
   a) removing water from a mixture of solid and/or liquid hydrocarbons by heating;
   b) subsequent to a), further heating the mixture in a chamber in the absence of air and the water, to gasify or vapourise at least some of the hydrocarbons into hydrocarbon gas;
   c) subsequent to b), reacting in a downstream reactor or conduit connected to the chamber, the hydrocarbon gas with a catalyst to reduce chain lengths of hydrocarbons in the hydrocarbon gas and produce hydrocarbon products; wherein the catalyst includes or is prepared from a transition metal or transition metal salt, and a carbide, in which the catalyst is suitable for breaking down higher molecular weight hydrocarbons into lower molecular weight hydrocarbons, the catalyst comprising a zirconium sulfate, and a carbide where the weight ratio of zirconium sulfate to carbide is from about 2:3 to 3:2, the zirconium sulfate and the carbide being coated on a bead to provide a catalytic bead; and
   d) collecting or conveying the hydrocarbon products for use in liquid or gas form.

2. The method as claimed in claim 1, in which the transition metal salt is independently selected from a group comprising: a zirconium salt, a metal sulphate, and zirconium sulphate.

3. The method as claimed in claim 1, in which the carbide is independently selected from a group comprising: titanium carbide; tungsten carbide; niobium carbide; calcium carbide; molybdenum carbide; silicon carbide.

4. The method as claimed in claim 1, in which step (a) includes:
   i) heating the solid and/or liquid hydrocarbons for a period of time in a first reactor or conduit, to convert at least some lower molecular weight hydrocarbons into a first hydrocarbon gas;
   ii) heating the solid and/or liquid hydrocarbons remaining from step (i) for a longer period of time in the first reactor or conduit, or in a second reactor or conduit, to convert at least some of higher molecular weight hydrocarbons into a second hydrocarbon gas.

5. The method as claimed in claim 1, in which one or both of:
   the hydrocarbons in step (a) are heated to a temperature in the range 320 to 460° C.; and
   the reactor or conduit in step (b) is at a temperature between about 320 to 460° C.

6. The method as claimed in claim 1, in which the reactor or conduit in step (b) is at a temperature between about 380 to 420° C.

7. The method as claimed in claim 1, in which heating the hydrocarbons during step (a) provides one or more melt seals at an entrance to the chamber.

8. The method as claimed in claim 1, in which step (c) includes at least one of:
   condensing at least some of the hydrocarbon products into one or more liquid products at room temperature and atmospheric pressure; and
   transferring the hydrocarbon products to a container or burning the hydrocarbon products to power a device such as a generator.

9. The method as claimed in claim 1, in which the solid and/or liquid hydrocarbons are independently selected to include one or more of the following:
   two or more different plastics or polyolefins, optionally also including one or more styrenes;
   lubricating oil;
   synthetic oil;
   mineral oil;
   engine oil.

10. The method as claimed in claim 1, in which during heating in step (a) the hydrocarbons are mixed by at least one lobed element for evenly heating the hydrocarbon mixture.

\* \* \* \* \*